(12) United States Patent
Jung

(10) Patent No.: US 8,177,543 B2
(45) Date of Patent: May 15, 2012

(54) DEMOLDING DEVICE FOR DEMOLDING A TOOL FROM A MOLD

(75) Inventor: Horst Jung, Dormettingen (DE)

(73) Assignee: D-M-E Europe CVBA, Mechelen (BE)

( * ) Notice: Subject to any disclaimer, the term of this patent is extended or adjusted under 35 U.S.C. 154(b) by 392 days.

(21) Appl. No.: 12/601,870

(22) PCT Filed: Oct. 23, 2007

(86) PCT No.: PCT/EP2007/061375
§ 371 (c)(1),
(2), (4) Date: Nov. 25, 2009

(87) PCT Pub. No.: WO2008/154964
PCT Pub. Date: Dec. 24, 2008

(65) Prior Publication Data
US 2010/0159054 A1     Jun. 24, 2010

(30) Foreign Application Priority Data
Jun. 17, 2007   (DE) .......................... 10 2007 028 434

(51) Int. Cl.
*B29C 45/40* (2006.01)
(52) U.S. Cl. ........................................ 425/556; 425/442
(58) Field of Classification Search .............. 425/442, 425/444, 436 R, 436 RM, 556, 593, 595; 264/334
See application file for complete search history.

(56) References Cited

U.S. PATENT DOCUMENTS

| | | | | |
|---|---|---|---|---|
| 858,812 A * | 7/1907 | Johns | ............................... | 249/68 |
| 1,544,316 A * | 6/1925 | Hazeltine | ......................... | 425/36 |
| 3,624,672 A * | 11/1971 | Spivy | ............................. | 425/156 |
| 3,753,641 A * | 8/1973 | Turner et al. | ................ | 425/451.6 |
| 3,824,053 A * | 7/1974 | Styrkowicz | ................... | 425/123 |
| 3,825,396 A * | 7/1974 | Kontz | ............................ | 425/541 |
| 4,073,609 A * | 2/1978 | Petrenchik | .................... | 425/442 |
| 4,083,910 A * | 4/1978 | Tits et al. | ....................... | 264/523 |
| 5,037,289 A * | 8/1991 | Ohta et al. | .................... | 425/532 |
| 5,064,365 A * | 11/1991 | Nichols et al. | ............. | 425/436 R |
| 6,212,911 B1* | 4/2001 | Desbiendras et al. | .......... | 65/227 |
| 6,427,490 B1* | 8/2002 | Bordt et al. | ....................... | 65/68 |
| 6,869,556 B2* | 3/2005 | Ho et al. | ................. | 264/272.17 |
| 7,306,451 B2* | 12/2007 | Kruger et al. | ................. | 425/442 |
| 2002/0155191 A1* | 10/2002 | Schneider | ..................... | 425/589 |

* cited by examiner

*Primary Examiner* — Yogendra Gupta
*Assistant Examiner* — Emmanuel S Luk
(74) *Attorney, Agent, or Firm* — Karl F. Milde, Jr.; Eckert Seamans Cherin & Mellott, LLC

(57) ABSTRACT

A demolding device (10) for demolding a work piece from a mold comprises a hold-down element (18) that is disposed between the mold pieces in the closed state of the mold and extends up to or into a cavity provided for producing the work piece. A control sleeve (11) is connected to the hold-down element (18) and is coupled with one of the mold parts in a form-fitting manner via a guide device. The piston (11) is displaceable along a first path (w1) along the stroke direction limited by the guide device and is mounted in the guide device in a pivotable fashion. Upon a pivot motion, the end of the piston (11) facing the cavity moves away from the cavity. A first control piece (16) is connected to the other mold piece, the control piece blocking a pivoting of the piston (11) and/or the hold-down element (18) during the first path (w1).

16 Claims, 13 Drawing Sheets

Fig. 4
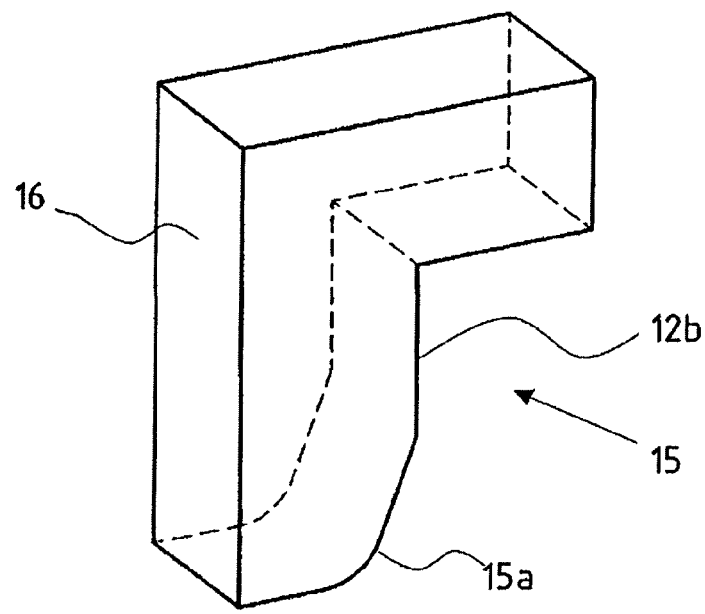
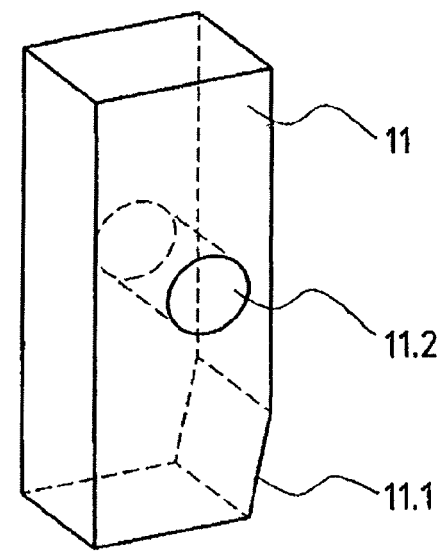
Fig. 5

DEMOLDING DEVICE FOR DEMOLDING A TOOL FROM A MOLD

BACKGROUND OF THE INVENTION

The invention relates to a demolding device for demolding a work piece from a mold that comprises an upper mold component and a lower mold component with the mold components being movable in relation to each other along a stroke direction.

In conventional molds, the work piece is lifted up together with the upper mold component and in this manner separated from the lower mold component. Additionally, to separate the work piece from the upper mold component, one or more pin-shaped ejectors are provided at the upper mold component forcing a relative movement between the work piece and the upper mold component and in this manner leading to the desired separation. A disadvantage of this method is that the application of force leads to undesired deformation of the still warm work pieces in the area of the ejector. This reduces the optical impression of the work pieces.

It is also known to provide at least one, preferably two hold-down elements on the side in the area of the separation surface between the upper mold component and the lower mold component, with said hold-down element separating the work piece from the upper mold component after a specified distance. To be able to remove the work pieces, the operating personnel must pivot the hold-down elements out of the work area by 90° to 180° and then later pivot them back in. If pivoting in is forgotten, the mold can be damaged or destroyed when it is closed.

SUMMARY OF THE INVENTION

It is the objective of the invention to provide a demolding device with a simple design for demolding a work piece from a mold.

This objective is achieved by a demolding device which comprises a hold-down element that is disposed between the mold pieces in the closed state of the mold and extends up to or into a cavity provided for producing the work piece. A control sleeve is connected to the hold-down element and is coupled with one of the mold parts in a form-fitting manner via a guide device. The piston is displaceable along a first path (w1) along the stroke direction limited by the guide device and is mounted in the guide device in a pivotable fashion. Upon a pivot motion, the end of the piston facing the cavity moves away from the cavity. A first control piece is connected to the other mold piece, the control piece blocking a pivoting of the piston and/or the hold-down element (18) during the first path (w1).

This objective is achieved by a demolding device with the features of claim 1.

Preferably, the demolding device is placed in pairs at opposite sides of a mold that comprises an upper mold component and a lower mold component, whereby the mold components are movable in relation to each other along a stroke direction.

The designations "upper mold component" and "lower mold component" are used in a device in terms of the present invention only to address the one or the other half of the mold of a casting tool with reference to the drawings of the description of the present invention without specifying with it a mandatory spatial location. When the description below states, for example, that the piston is positioned at the lower mold component and the hold-down element at the upper mold component, a reverse arrangement is possible just as well.

The demolding device according to the invention comprises:

A hold-down element, which in the closed state of the mold is arranged at least partially between the mold components and extends into a cavity provided for manufacturing the work piece where it forms a portion of a shape-giving surface, A piston that is connected to the hold-down element and that is coupled in a form-fitting manner via a guide device with one of the mold components, for example the lower mold component, and A control component that is connected to the upper mold component, for example.

The function of the aforementioned tool is as follows:

The piston coupled with a mold component can be moved along the stroke direction along a first path distance w1 that is restricted by a guide device. Thus, the hold-down element connected to it can remain in contact with the other mold half during the path distance w1. During the first path distance w1, pivoting of the piston and/or of the hold-down element is blocked.

At the end of the path distance w1, the piston and the hold-down element are held back in the stroke direction, while that half of the mold that was initially in contact with the hold-down element can continue to travel across a second path distance w2. In the area of the second path distance, the piston and the hold-down element remain stationary in relation to the lower mold component, while the upper mold component continues to move away from the lower mold component. In this manner, a work piece adhering to the upper mold component is held back by the hold-down element and is stripped off.

During the second path distance w2, the upper mold component can continue its movement in the stroke direction, whereby the control component connected to it continues to block a pivot motion of the hold-down element.

The blockage is lifted only after the additional path distance w2, at which point the hold-down element can be pivoted to the side, moving the end of the piston that previously covered the cavity in the mold in a pivoting motion outwards. This permits access to the work piece in the cavity through automatic grippers, or with a vertical orientation of the separating plane, the work piece can now drop out freely between the mold components that have been lifted off each other.

In the third path distance, the piston with the hold-down element can rotate around the rotational axis perpendicular to the stroke movement in particular with the aid of the spring element.

During closing, in reverse order first the piston with the hold-down element is returned to its starting position by the first control component against the force of the spring element and only then will the upper mold component be placed onto the lower mold component.

With this inventive solution, the work piece is fully separated from the lower mold component and the upper mold component when the mold is opened and at the same time the hold-down element is moved out of the way. This is done fully automatically. When the mold is closed, the hold-down elements are again fully automatically returned to the initial position such that damage is prevented reliably. In addition, this inventive solution has a simple design and can be adapted easily to all embodiments of molds. Finally, ejectors can be omitted entirely, leading to cost-savings.

The arrangement of a spring element or other actuator element used for bracing and located between the piston and the lower mold component near the hold-down element close to the end of the piston has the advantage that the lever for separating the hold-down element can be relatively large.

The use of a recess in the upper mold component for receiving the hold-down element prevents damage to the mold during closing.

The arrangement of a mold draft in the area of the hold-down element pointing toward the upper mold component ensures that said hold-down element does not become wedged together with the upper mold component when the mold is opened but instead that it separates easily from the recess.

The arrangement of a second control component in the area underneath the rotational axis of the lower mold component, which also causes a rotational movement of the piston around the rotational axis against the force of the spring element when closing the mold, improves the function of the mold and ensures that the hold-down element is pressed in reliably. Additional advantageous details of embodiments of the invention become apparent from the subordinate claims, the drawing and the associated description.

BRIEF DESCRIPTION OF THE DRAWINGS

FIG. 4 shows a simplified, perspective view of a first control component according to the exemplary embodiment.

FIG. 5 shows a simplified, perspective view of a piston according to the exemplary embodiment.

DESCRIPTION OF THE PREFERRED EMBODIMENTS

Figure 1:
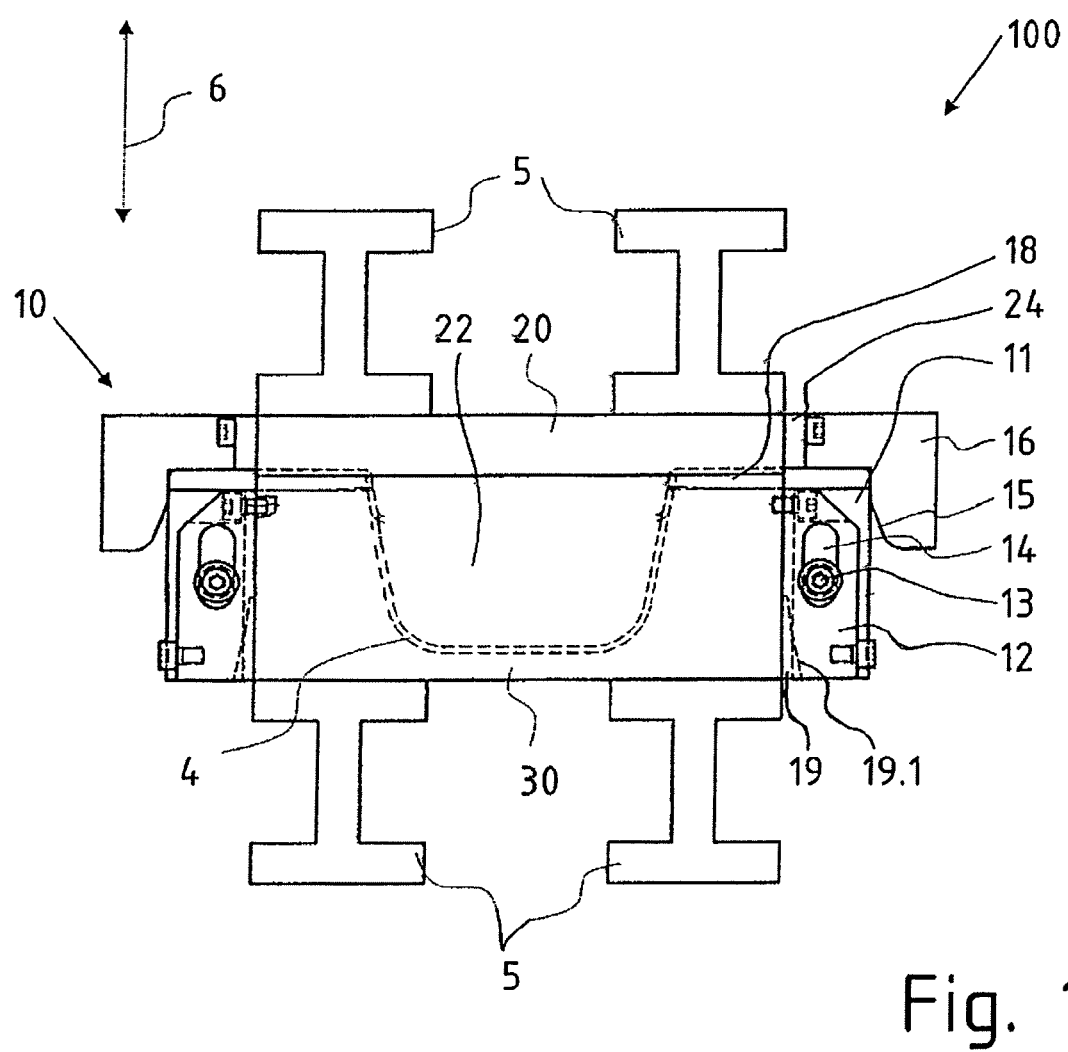
FIG. 1 shows a cross-section of an exemplary embodiment of a mold with a demolding device according to the invention.

The preferred embodiments of the present invention will now be described with reference to FIGS. 1-16 of the drawings. Identical elements in the various figures are designated with the same reference numerals.

The mold designated in FIG. 1 overall with the number 100 exhibits an upper mold component 20 and a lower mold component 30, which together form a mold for producing a work piece 4, in particular one made of plastics. In the shown exemplary embodiment, this is a tub-shaped work piece 4. Here, the upper mold component 20 and the lower mold component 30 are each connected to two carriers 5 that are used to move the two components 20, 30 in a known manner relative to each other in a stroke direction 6.

On opposite sides of the mold 100, respective demolding devices 10 are provided for demolding the work piece 4 from the mold 100.

With the essentially known production of a work piece through injection molding, the mold 100 is initially closed such that the upper and the lower mold components 20, 30 are contacting each other and a suitable material, for example polyurethane, is injected through the cavities formed by the recesses in the mold components 20, 30. After at least partial curing, the mold 100 is opened and the work piece 4 is separated from both the lower mold component 30 and the upper mold component 20 and then removed. Typically, the mold 100 is designed such that the work piece 4 remains stuck to the upper mold component 20 when the mold 100 is opened and is separated from the lower mold component 30 when the mold components 20, 30 travel apart in the direction 6. To this end, for example undercuts (not shown) can be provided at the upper mold component 20 that clamp the work pieces 4 initially to the upper mold component 20 and allow for it to be pulled out of the lower mold component 30.

According to the invention, on opposite sides of the mold 100, respective demolding devices 10 are provided for separating the work piece 4 from the upper mold component 20.

According to this exemplary embodiment, the mold 100 is cuboidal and a demolding device 10 is arranged on each longitudinal side. The number of demolding devices 10 is also variable, with generally at least two demolding devices 10 being required for a reliable operation.

The arrangement of the demolding devices 10 is also not limited to the shown positions but can be selected according to the work piece 4 that is to be produced.

Figure 8:
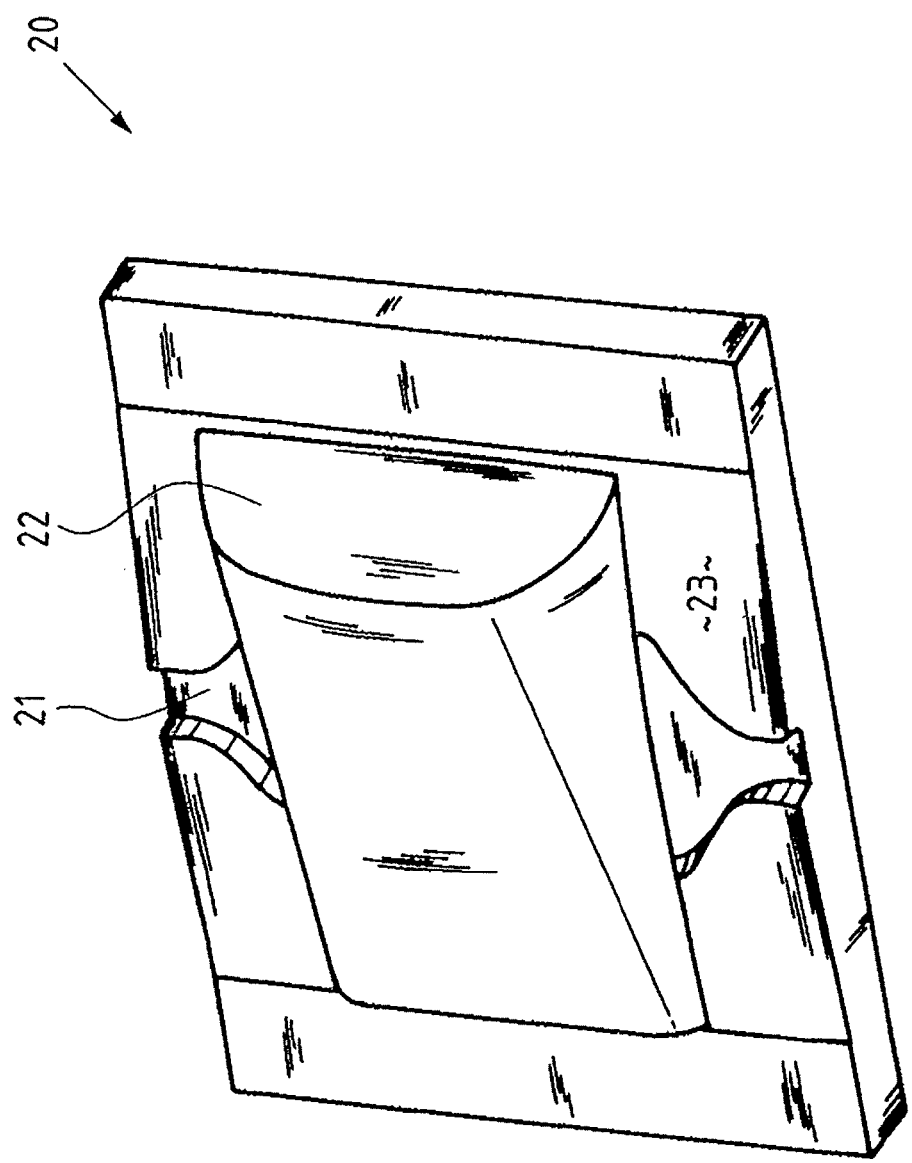
FIG. 8 shows a simplified, perspective view from below of an upper mold component according to the exemplary embodiment.

The core piece of the demolding device 10 according to the invention is a hold-down element 18, which in the closed state is arranged between the mold components 20, 30. A recess 21 is provided in at least one mold component 20 or 30 for fully receiving the hold-down element as shown in FIG. 8. The areas of the hold-down element 18 located between the mold components 20, become with at least one surface a part of the shaping mold 100.

The demolding device 10 exhibits at least
One guide component 12,
One piston 11,
One actuator element, in particular a spring element, not shown in any detail in the Figures,
the hold-down element 18, and
A first control component 16.

In the exemplary embodiment shown, the guide component 12 is connected to the lower mold component 30; however, a reverse arrangement is possible as well.

In this example, the piston 11 is connected to the hold-down element 18 in a detachable manner, which allows for easy adaptation of the hold-down element to the mold components 20, 30. By changing the hold-down element 18, the remaining demolding device 10 can be transferred to other molds 100 such that only partial areas of the hold-down element that engage in the cavity need to be adapted individually.

Alternatively, the piston 11 and the hold-down element 18 can also be made of one piece or can be assembled of more than two pieces.

The piston 11 and the guide component 12 act together in such a manner that the piston 11 can be moved by a first specified path distance along the stroke direction 6 in relation to the guide components 12 and at the same time can be pivoted around a rotational axis 13 that is perpendicular to the stroke direction 6.

The movement is enabled in a simple manner in that the guide component 12 exhibits a guide, for example in the shape of a cuboidal recess for the piston 11, which in the example has a cuboidal design. Of course, other cross-sectional shapes or other guide alternatives are possible as well.

In complementary fashion, the guide components 12 exhibit recesses 14 extending in the respective stroke direction 6. The rotational axis 13 engages in these recesses 14. In this manner, the rotational axis 13 supported by the piston 11 fulfills in the shown exemplary embodiment of the invention several functions at the same time:

First, it serves as a glide element in a guide track that is formed by the recesses 14 and guides the path of the piston 11.

Then the rotational axis 13, when it has arrived at the end of the recesses 14, serves as a fixed stop and coupling element for holding back the piston with the hold-down element 18 at the lower mold component 30.

And finally it serves the pivotability of the piston 11.

In the first exemplary embodiment, the rotational movement of the piston 11 around the rotational axis 13 is caused by an actuator element (not shown), in particular a compression spring, which is preferably arranged adjacent to the hold-down element 18 between the piston 11 and the lower mold component 30. Through this arrangement, the lever arm and thus the moment for the pivoting movement are increased. However, it is also possible to position the spring element at another location as long as this enables the same movement.

Aside from a conventional helical spring, it is also possible to employ other, for example, mechanical, pneumatic or hydraulic actuators as the actuator elements.

In the closed state of the mold 100, the hold-down element 18 that is connected to the piston 11 extends in the area between the lower mold component 30 and the upper mold component 20 into the area of the work piece 4 that is to be produced. When opening the mold 100, the hold-down element 18 separates the work piece 4 from the upper mold component 20. In the fully opened state of the mold 100, the hold-down element releases the work piece and allows for the removal of the work piece 4 from the mold 100.

The first control component 16 is connected to the upper mold component 20 and exhibits a control edge 15 with two regions 15a, 15b, whereby the one region 15b of the control edge that is pointing toward the lower mold component 30 causes a rotational movement of the piston 11 around the rotational axis 13 against the force of the spring element in the direction of the lower mold component 30 during closing and whereby the other region 15b of the control edge 15 that is pointing toward the upper mold component 20 enables a translatory movement of the first control component 16 relative to the piston 11 essentially along the stroke direction 6.

Figure 7:
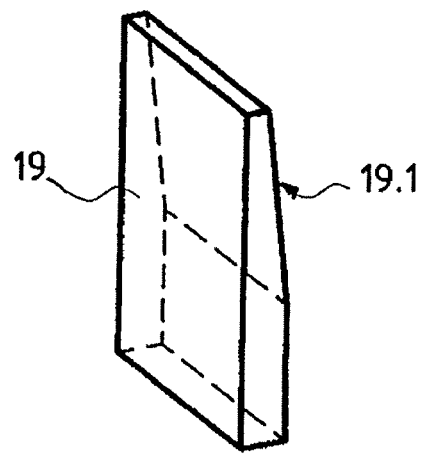
FIG. 7 shows a simplified, perspective view of a second control component according to the exemplary embodiment.

To support the rotational movement of the piston 11 back into the starting position, an additional control component 19 can be arranged at the lower mold component 30 as shown in the exemplary embodiment and act with its incline 19.1 together with the corresponding incline at the piston 11 (see further down at FIGS. 5 and 7).

Figure 2:
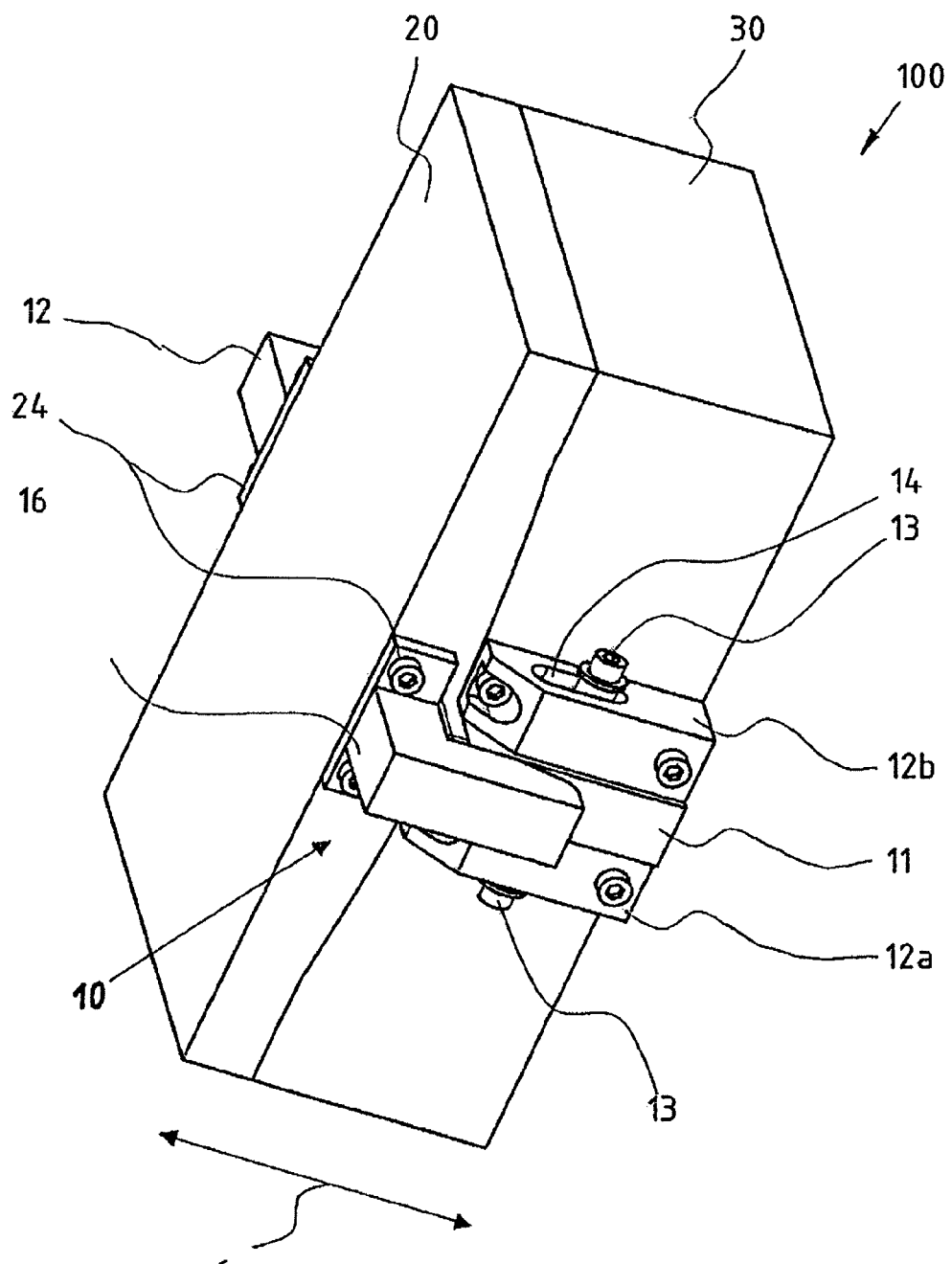
FIG. 2 shows a simplified, perspective view of the exemplary embodiment according to FIG. 1.

In FIG. 2, the carriers 5 and the entire device for moving the upper mold component 20 relative to the lower mold component 30 along the stroke direction 6 are not shown because their type and arrangement are not significant for the invention.

In the shown exemplary embodiment, the first control component 16 is attached to the upper mold component 20 using a holding plate 24 and two screws. As an alternative, the first control component 16 and the holding plate 24 could also be designed of one piece or could be an integral component of the upper mold component 20.

In the exemplary embodiment, two individual guide components 12a, 12b at a distance to each other and perpendicular to the stroke direction 6 are provided at the guide component 12 and are each fastened at the lower mold component 30 using two screws and have the piston 11 guided between them in the stroke direction 6. The mirror-symmetric arrangement counteracts a canting of the movable parts against each other.

Both guide components 12a, 12b exhibit a respective slot 14, for example in the shape of longitudinal holes. The rotational axis 13 that is connected to the piston 11 is guided in the corresponding slots 14, whereby the relative stroke movement of the piston 11, or of the hold-down element 18, respectively, is limited toward the lower mold component 30 to a first specified path distance w1 that is defined by the slot 14. In other words, the extensions of the recesses 14 in the stroke direction 6 define the path that the work piece 4 together with the upper mold component 20 can pass away from the lower mold component 30, until the hold-down element(s) 18 separate the work piece 4 from the upper mold component 20.

Figure 3:
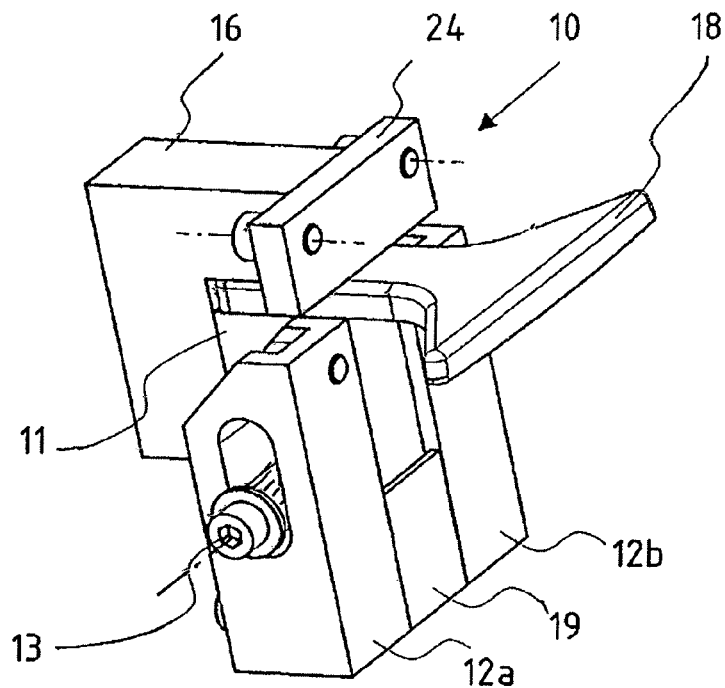
FIG. 3 shows two perspective views of a demolding device according to the exemplary embodiment.
Figure 3:
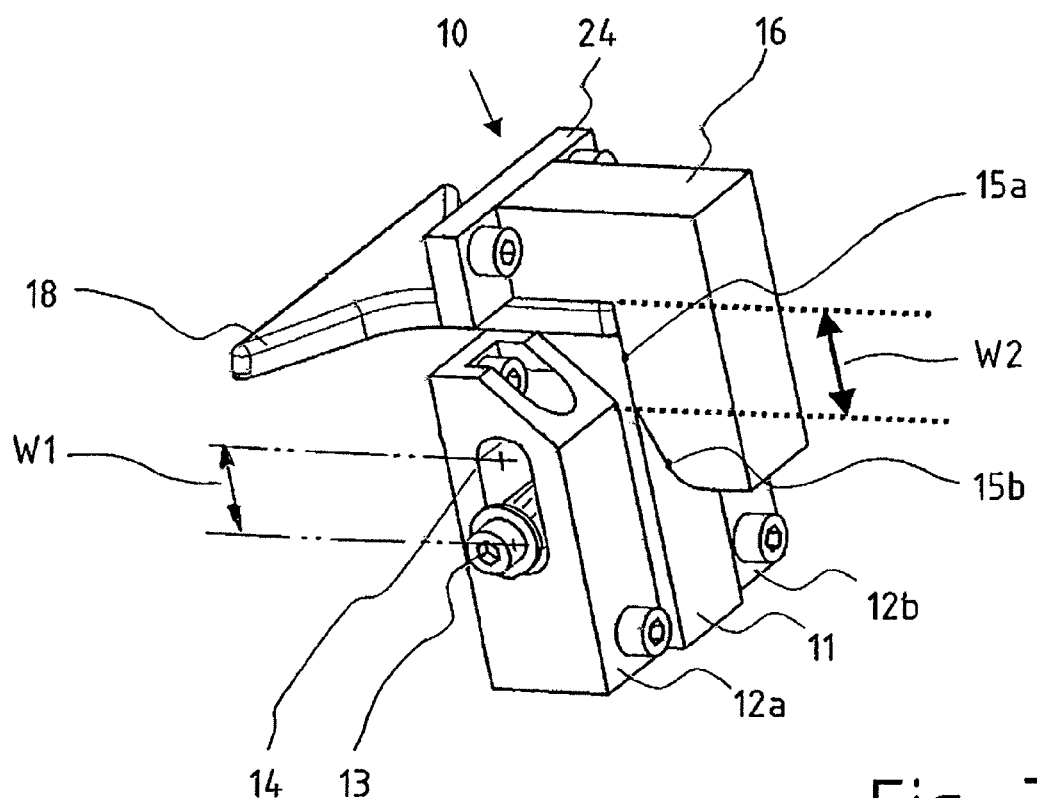
Figure 6:
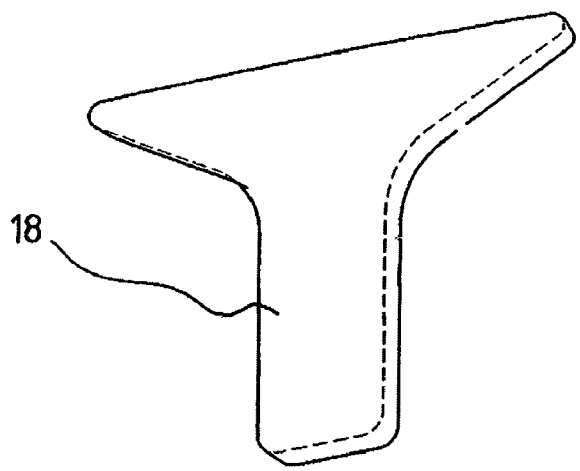
FIG. 6 shows a simplified, perspective view of a hold-down element according to the exemplary embodiment.

In the presentation of FIG. 3, the mold 100 itself is also omitted such that only demolding devices 10 are shown in a perspective view at an angle from the front or at an angle from the back and the demolding devices 10 can be arranged in a preferred manner at a mold. It can be seen that the two essentially cuboidal control components 12a, 12b are kept at a distance to each other by a connecting component 12c, such that a rectangular-shaped guide is created in-between. Of course, this guide may also have a different cross-sectional shape. The type of attachment can also be adapted to the requirements.

The second control component 19 is not as high as the guide components 12 such that a recess is created in the upper part. The spring element, or another actuator element, can be mounted in the area of this recess between the piston 11 and the lower mold component 30, such that the spring element rests directly on the lower mold component 30. Alternatively, the spring element can also rest on the guide component 12, which in turn is arranged stationary at the lower mold component 30.

In FIG. 4, the control edge 15 with the areas 15a, 15b are again shown as the significant features of the control component 16. The area 15a defines the stroke of the stroke movement and thus how far the upper mold component 20 is moved out of the work piece before the rotational movement of the piston 11 and thus a full release of the work piece 4 is enabled due to the area 15b.

FIG. 5 once again shows the piston 11 with a bore hole 21 for receiving the rotational axis 13, as well as an incline 20 arranged at the lower end of the piston 11 that is pointing toward the lower mold component 30. The incline 20 in interaction with a corresponding incline 17.1 at the second control component 17 supports the return rotation of the piston 11 and of the hold-down element 18 when the mold 100 closes to its initial position. Of course, similar to the area 15b of the control edge 15, this incline can also exhibit a contour that deviates from the flat surface.

FIG. 6 once again shows in detail the hold-down element 18 with a mold draft 18 arranged at the edge that is pointing toward the upper mold component 20. This narrowing serves the avoidance of a jamming of the hold-down element 18 in a recess 23 in the upper mold component 20.

FIG. 7 once again shows the second control component 19 with an incline 19.1 that corresponds to the incline on the piston 11. Preferably, this second control component 19 can be employed as a supplement to the first control component 16 for the rotational movement of the piston 11.

FIG. 8, finally once again shows the upper mold component 20 in a view from the bottom. The two recesses 21 for the two hold-down elements 18 can be recognized in it. One can also see that the upper mold component 20 exhibits a core 22 that protrudes into the lower mold component 30. Furthermore, the Figure shows that the hold-down element 18 later rests partially on the core 22 such that after the production of the work piece 4, the hold-down element 18 is arranged in this area in the stroke direction 6 between the upper mold component 20 and the lower mold component 30.

Below, the movement sequences and the functionality of the mold 100 according to the invention will be explained with reference to FIGS. 9 to 12, each showing the mold from the same perspective viewing direction in various states.

Figure 9:
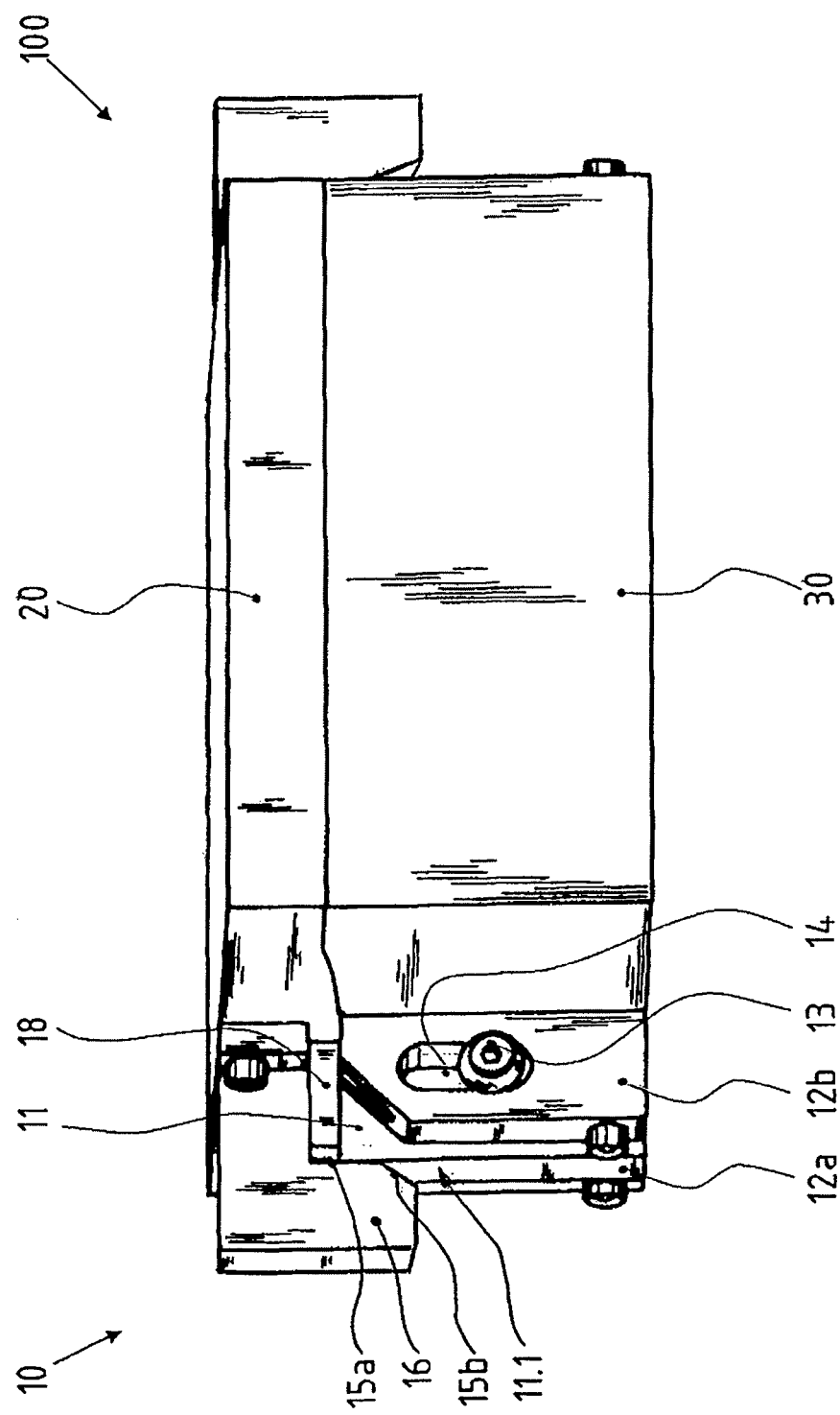
FIGS. 9 to 12 each show a perspective view of a mold with a demolding device in various states of movement.

FIG. 9 shows, in the same manner as FIGS. 1 and 2, the mold 100 with two demolding devices 10 in the fully closed position. In this position, the piston 11 is held by the control area 15b of the first control component 16 against the force of the spring element in an essentially parallel position to the stroke direction 6 and with that the hold-down element 18 in an essentially parallel position to the separation area between the upper mold component 20 and the lower mold component 30.

When the mold 100 is opened, and in the process the upper mold component 20 is moved upwards along the stroke direction 6, the following are moved upward at the same time:

The first control component 16, because it is defined at the upper mold component 20, The hold-down element 18, because it is "clamped" between the upper mold component 20 and the work piece 4 that is attached to it, The piston 11, because it is connected to the hold-down element 18, and The rotational axis 13, because it in turn is connected to the piston 11.

Figure 10:
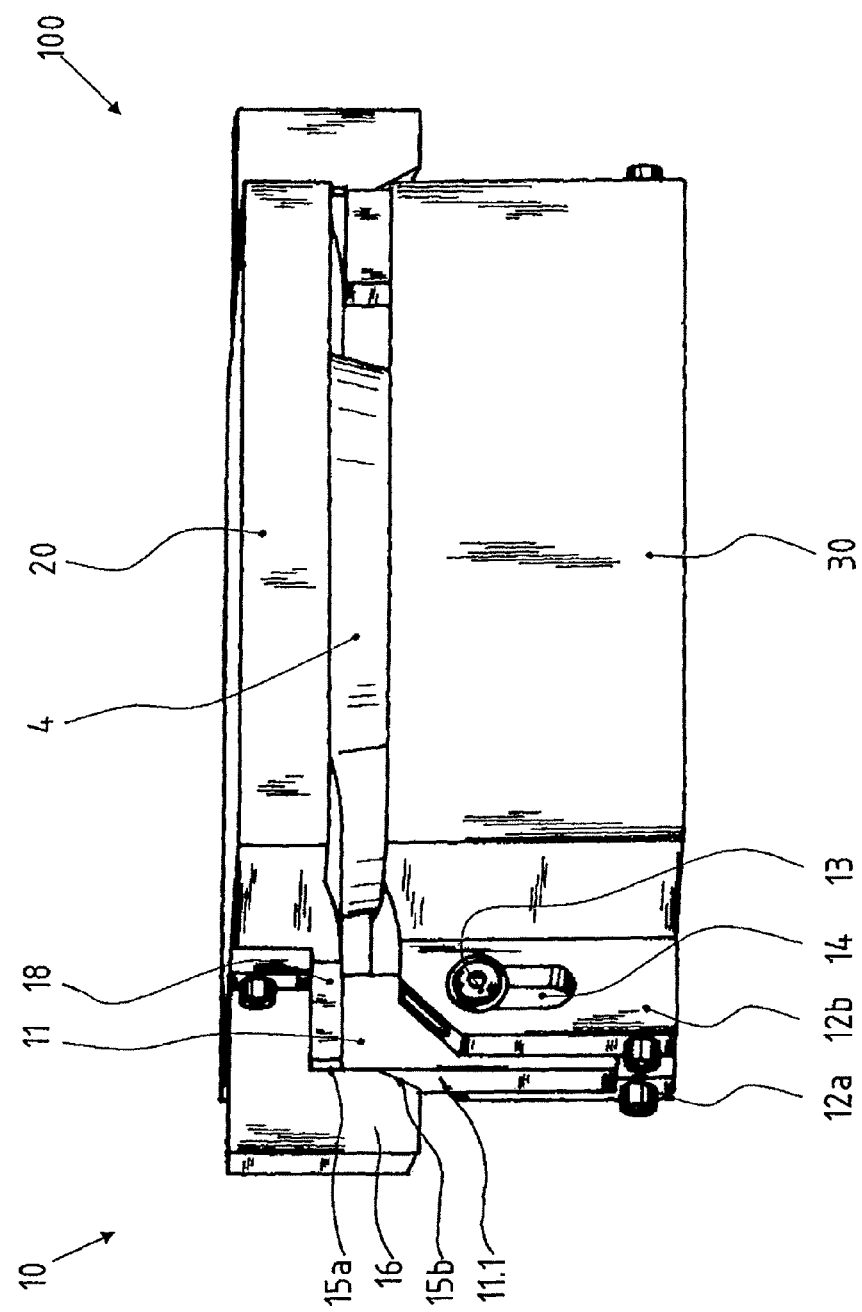

The state shown if FIG. 10 is achieved. In this state, the mold halves 20, 30 are slightly separated from each other. The work piece 4 is already visible. In this first phase of the opening sequence of the mold 100, the first control element 16 remains almost stationary in relation to the piston 11, whereby also the area 15a of the control edge 15 remains positioned in front of the guide surface 11.1 at the piston 11 or even rests on it such that a pivoting motion of the piston 11 is not possible.

When the upper mold component 20 was moved upward by the first path distance w1 (cf. FIG. 1), which essentially is defined by the bore hold distance in the stroke direction 6 in the slot 14, then the rotational axis 13 arrives at the stop at the upper end of the slot 14 and in this manner secures the piston 11 and the hold-down element 18 in the stroke direction 6 relative to the lower mold component 30.

Figure 11:
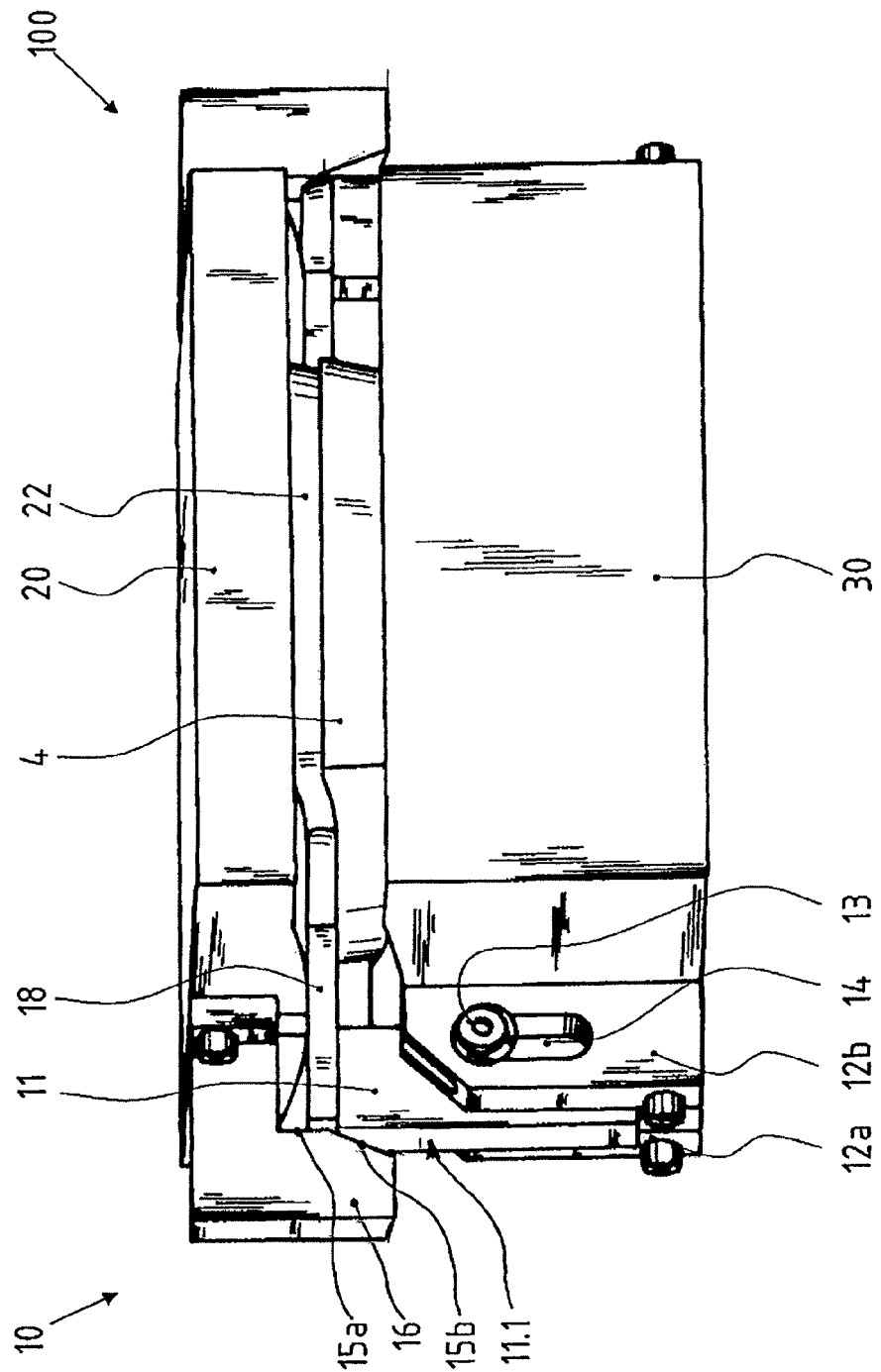
Figure 12:
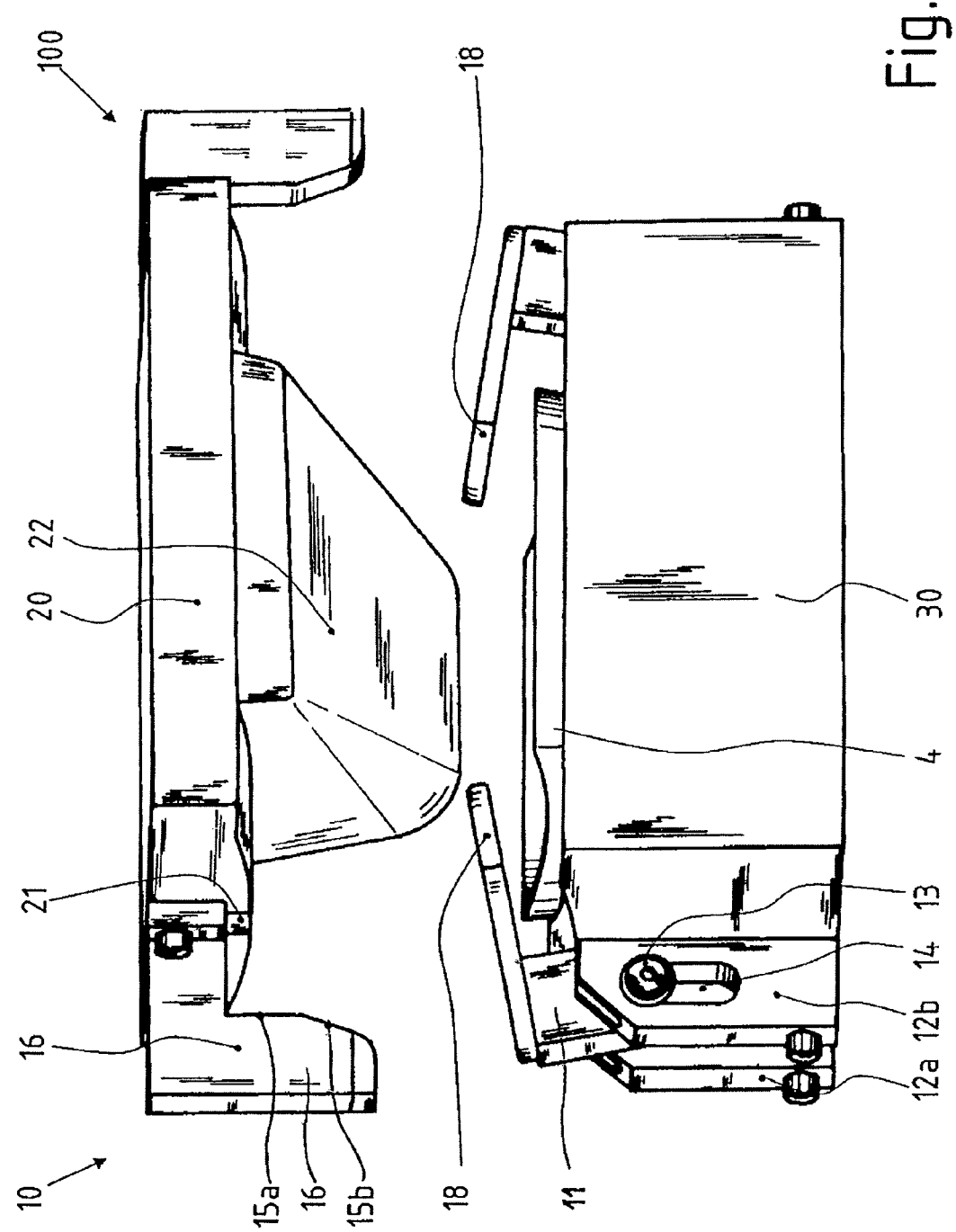

Thus, a relative movement between the upper mold component 20 and the hold-down element 18 occurs during the subsequent upwards movement of the upper mold component 20 in the stroke direction 6 due to the form-fitting stop of the rotational axis 13 at the upper end of its guide track, which in this case is formed by the slot 14, and the hold-down element 18 that is connected via the piston 11 to the rotational axis 13. This state is shown in FIG. 11. With the continued movement of the upper mold component 20 in the stroke direction 6 in the area of a second specified path distance w2, a relative movement now occurs in the stroke direction 6 between the first control component 16 and the piston 11. The second path distance w2 is essentially defined by the expanse of the area 15a in the stroke direction 6 at the first control component 16. As long as the straight upper area 15a of the control edge 15 rests on the glide surface 11.1 at the piston, only a translatory movement in the stroke direction 6 is possible while a rotational movement of the piston 11 continues to be prevented. FIG. 12 shows the state shortly after the area 15a of the control edge 15 no longer contacts the glide surface 11.1 and instead the set-off area 15b is located opposite the piston.

Only when the upper mold component 30 with the first control component 16 is moved upwards beyond the second path distance w2, the set-off area 15b that runs at an angle to the first area 15a allows rotational movement of the piston 11 away from the lower mold component 30 caused by the force of the actuator element. The geometric shape of the area 15b determines the amplitude and the angular speed of the pivoting movement.

Through the pivoting movement, the hold-down element 18, which is connected to the piston 11, is also moved away from the lower mold component 30, such that the work piece 4 is fully released and can be removed from the mold 100. The demolding device 10 can be dimensioned such that the second control component 16 can serve at any time as a stop for the rotational movement of the piston 11. As an alternative, the second control component 16 can also be moved upwards sufficiently such that the piston 11 no longer contacts the control edge 15. In this case, the lower mold component 20, or the guide component 12, respectively, serves as a stop to limit the rotational movement at the lower side of the piston 11.

When closing the device 10 (after removing the work piece), the piston 11 is then turned back through the downwards movement of the upper mold component 20 against the force of the spring element through the area 15b of the control edge 15 in the direction of the lower mold component 30 and in this manner the hold-down element 18 is returned to its starting position. Thereafter, the upper mold component 20 is moved down by the second path distance w2 until the first control component 16 comes in contact with the hold-down element 18 and returns the hold-down element and the piston 11 along the stroke direction 6 back into the starting position.

Thus, the first path distance w1 defined by the recesses 14 defines the height by which the upper mold component 20 with the work piece 4 is lifted out of the lower mold component 20, before the work piece 4 is separated from the upper mold component 20 with the aid of the hold-down element 18. The height is defined by the length of the second path distance w2 by which the upper mold component 20 is lifted out of the work piece 4, before the hold-down element 18 is separated and the work piece 4 is fully released for removal. In this manner, the device 10 can be adapted variably to the dimensions of the upper mold component 20 in the stroke direction 6. The shape of the area 15b additionally controls the rotational movement of the hold-down element 18. This description of the functionality makes it clear that the invention is not determined by the concrete design of the individual parts and of the functional surfaces. Rather, the important aspect is the interaction of respective components such that the functional surfaces must correspond with each other. In the exemplary embodiment, which most likely corresponds to the most common practical application, the upper mold component 20 and the lower mold component 30 carry out a simple linear movement, whereby the stroke direction 6 extends vertically to the separation surface between upper mold component 20 and lower mold component 30. The individual parts and the functional areas all run essentially parallel or perpendicular to the stroke direction 6. Only the area 15b of the control edge 15 exhibits a progression that deviates from the vertical or parallel arrangement.

Essential for the invention is that the following interim steps are ensured:

The relative movement of the upper mold component 20, work piece 4 and hold-down element 11 in relation to the lower mold component 30 in the stroke direction 6 in order to separate the work piece 4 from the lower mold component 30, The relative movement of the upper mold component 20 to the hold-down element 11 in the stroke direction 6 in order to separate the work piece 4 from the upper mold component and to move the upper mold component to a large degree or entirely out of the work piece, The relative movement between the work piece 4 and the hold-down element 18 perpendicular to the stroke direction 6 in order to fully release the work piece 4.

Particularly advantageous is the fact that the principle according to the invention is very easily adaptable to different molds 100 and work pieces 4. Variable are in particular the length and the position of the recesses 14, the position of the rotational axis 13, the length and the shape of the control edge 15 as well as the length and the shape of the hold-down element 18. In particular the hold-down element 18 with its end that is pointing towards the work piece 4 must be adapted to the shape of the work piece 4, because this end forms a part of the mold 100 and in this manner has an influence on the contour of the work piece.

Figure 13:
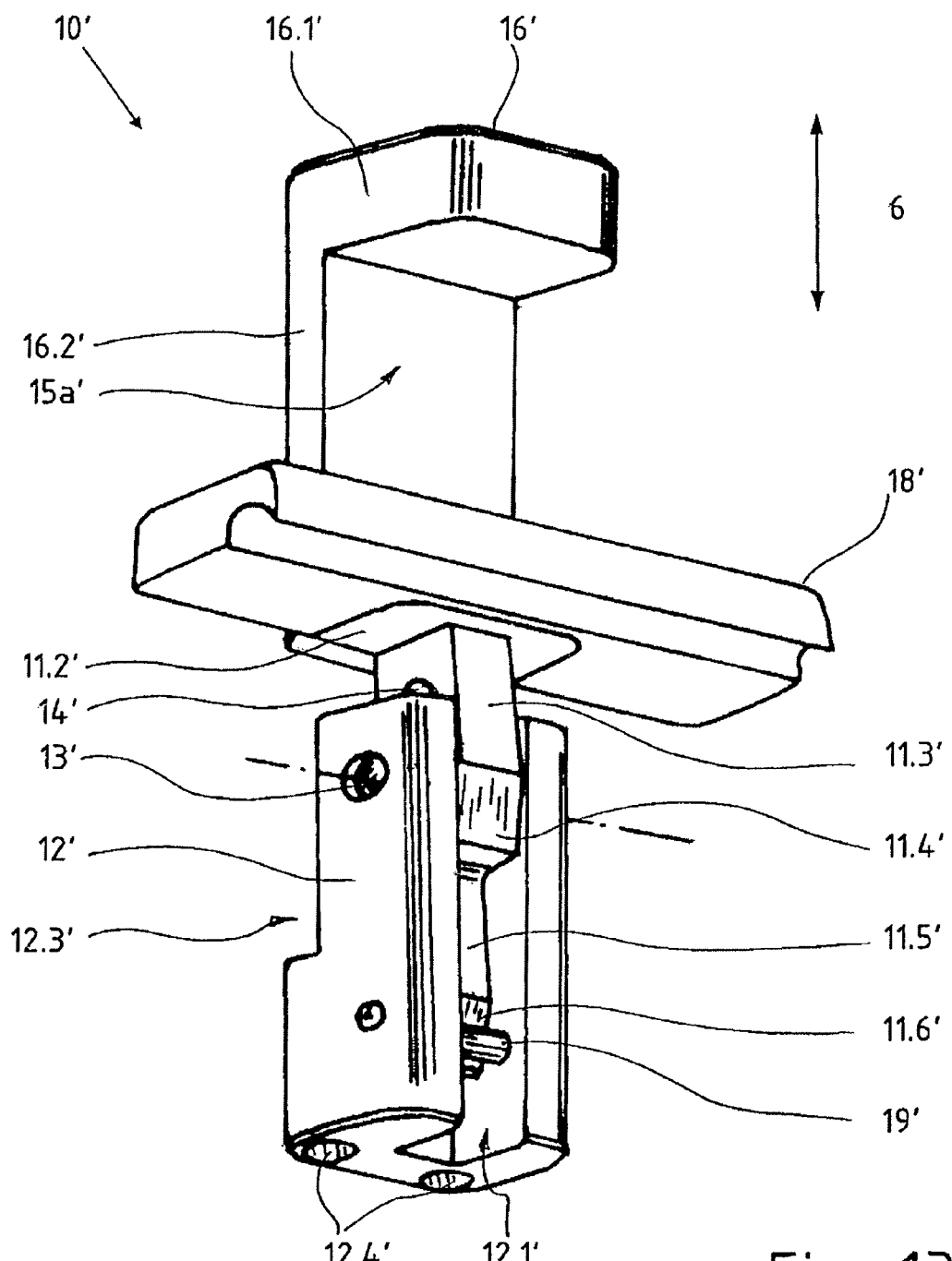
FIG. 13 shows a second, compact embodiment of a demolding device according to the invention.

FIG. 13 shows a second embodiment of a demolding device 10', which essentially has the same functionality as the embodiment described above, but has, however, a more compact design such that the demolding device 10' can be arranged in particular also within the separation area between the mold components of a mold and does not need to be arranged on the sides on its outer edges. Thus, such an embodiment can also be used with multiple injection molding tools. The demolding devices 10' can be arranged in the interim spaces between the individual cavities; in particular again in pairs at opposite sides of each cavity.

FIG. 13 shows an individual demolding device 10'. A first control element 16' is formed cuboidal in the head area 16.1', with rounded corners such that in the upper mold component a respective pocket for taking up the cuboidal section can be created easily using a milling cutter.

Figure 16:
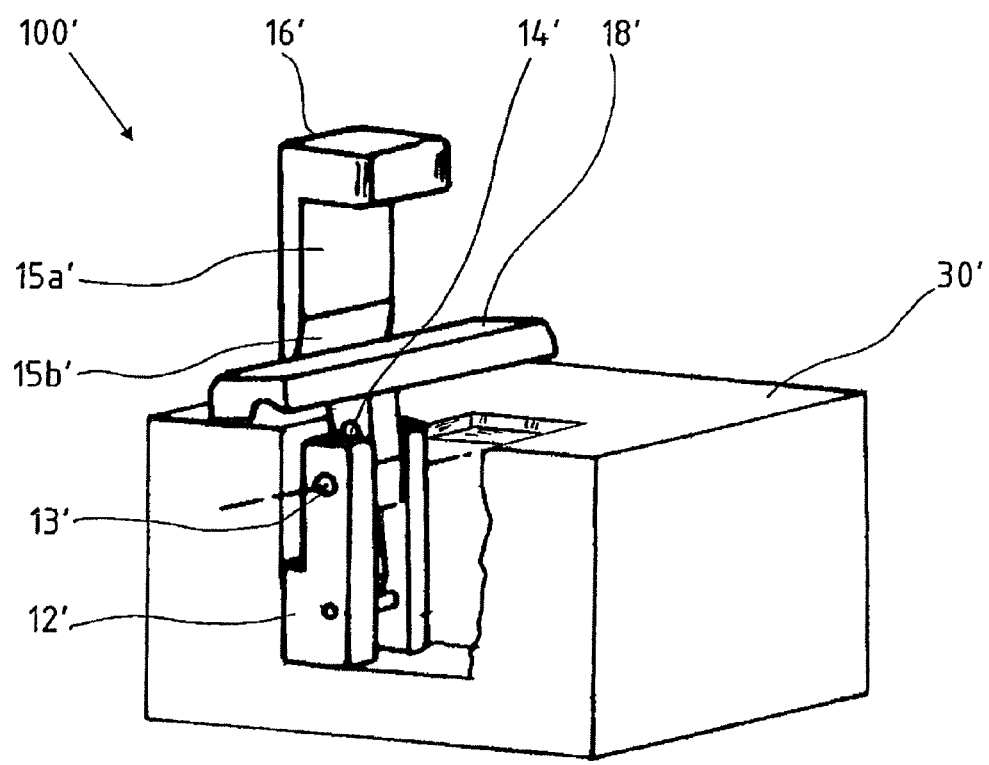

Following the head area 16.1' is a wedge area 16.2' which in turn exhibits a first area 15a' of a control edge 15', which is oriented parallel to the stroke direction 6, and an additional set-off area 15b', in particular at an angle, which can be recognized in FIG. 16. In the perspective view according to FIG. 13 at an angle from below, one can additionally recognize that a piston 11' also exhibits a head area 11.2'. In a hold-down element 18', which here has a longitudinal design, a respective pocket for taking up the head area 11.2' is milled in at the bottom side.

The piston 11' additionally exhibits at the rear side that is pointing towards the viewer in FIG. 13 several area sections 11.3' to 11.6'.

The first area section 11.3' runs parallel to the stroke direction and with the mold closed is oriented parallel to a pocket in the lower mold component 20', in which the guide component 12' can be inserted. The subsequent area section 11.4' is slightly set back at an angle in relation to the area 11.3' in order to enable the position of the piston 11' that is slightly tipped backwards as shown in FIG. 13. Formed in the upper area of the piston, however, below the head area 11.2', is a longitudinal hole 14' in which a bolt element, serving as the rotational axis 13' and positively arranged in the guide component 12', is guided. In contrast to the first embodiment of the invention, where the bolts were arranged in the piston and the control components that were located outside exhibited the longitudinal hole, here an opposite arrangement has been selected.

The guide component 12' has a basic configuration in the form of a longitudinal cuboid with strongly rounded corners. The curvature of the corners in turn serves the purpose of being able to easily create a respective pocket by milling in the lower mold component 30' in which the control component can be inserted with an accurate fit. Through holes 12.4' are used for attachments with the bottom of the pocket in the lower mold component.

In a rear area 12.3' in FIG. 13, the control component is hollowed sufficiently that with the closed demolding device 10', the wedge section 16.2' of the control component 16' can be received. In order to ensure when the upper mold component is returned to the lower mold component that the piston 11' pivots back into its starting position and aligns itself again in the stroke direction 6, in particular during the closing movement of the mold, similar to the first embodiment, an additional control component is implemented that here is designed as a lower extension 11.5', 11.6' of the piston 11'. The lower surface 11.6' has a wedge-shaped design, thus, has a slanted surface in relation to the stroke direction 6. In functional correlation with this is a bolt element 19' that is inserted in the lower area of the guide element 12'.

In the open position of the demolding device shown in FIG. 13, the area 11.6' rests on the bolt element 19' and prevents the piston with the hold-down element 18' from tilting to far outward. Once the closing movement of the mold starts, the control component 16' presses on the piston 11' via the hold-down element 18' and thus pushes the piston downward. The surface 11.6' glides down on the bolt 19' until the surface 11.5' is reached. This gliding movement of the surfaces 11.6', 11.5' on the bolt 16 has the effect that the piston 11' is again oriented in the stroke direction and that the hold-down element is again oriented plane-parallel to the separation plane.

Figure 14:
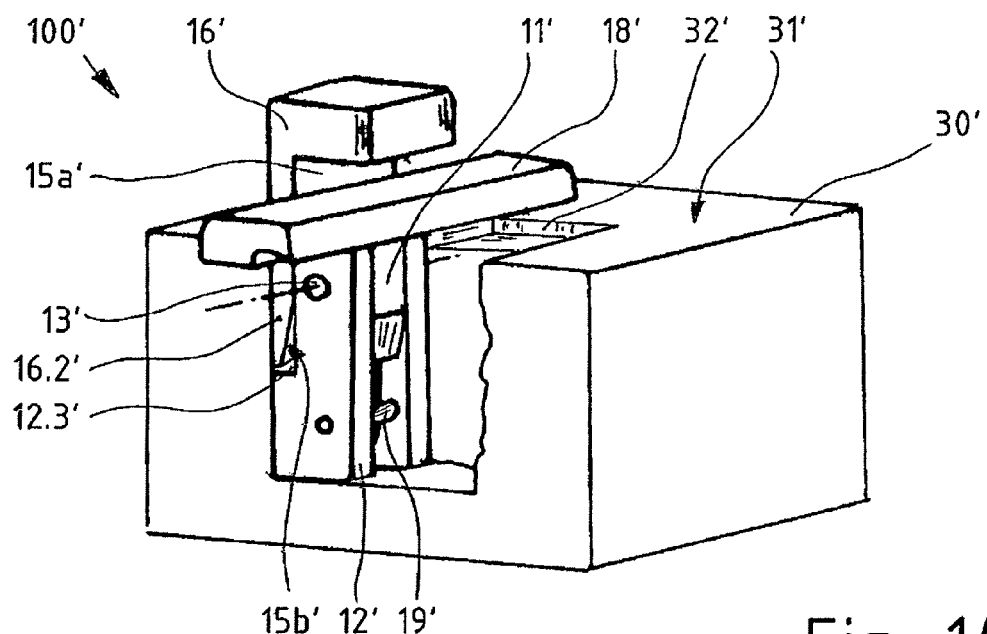
FIGS. 14 to 16 show perspective views of various states of movement of the second embodiment.
Figure 15:
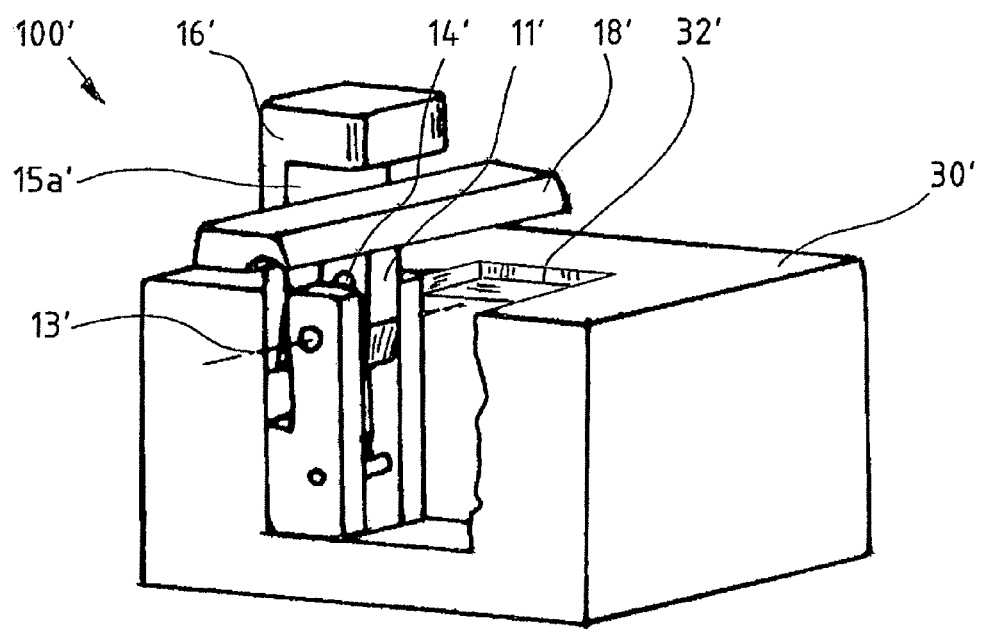

The movement sequence for the second embodiment is shown in FIGS. 14 to 16.

FIG. 14 shows the closed state with the upper mold component not shown. Indicated at the lower mold component 20' is a partial area in order to indicate the recessed arrangement of the guide component 12'. The hold-down element 18' is oriented plane-parallel to the separation plane 31'. The control component 16' is moved down as far as possible such that its wedge area 16.2' is received in the recess 12.3' of the control component 12.

In FIG. 15, the upward movement of the upper mold component has already started. Also the piston 11' with the hold-down element 18' has been lifted by the mold component (not shown here) and is still adhering to the upper mold component to an extent, until at the piston the rotational axis 13' is located at the lower end of the longitudinal hole 14'. From here, further movement of the hold-down element 18' is no longer possible such that with an additional upwards movement of the upper mold component only the work piece is stripped off.

With the continued upwards movement of the upper mold component, the control component 16' also continues to be lifted up. The area 15b' of the control edge no longer rests on the piston 11' such that it can tilt to the outside appropriately.

With the second embodiment, the hold-down element 18' can be balanced at the piston 11' in relation to the rotational axis such that a heavier area is turned away from the cavity 32'. As soon as the forced guide of the piston and hold-down element is removed by the control component 16, it can tilt away due to the greater outer mass, whereby this movement is limited by the surface 11.6' that comes to rest at the bolt 19'. However, the actuator elements for bracing that have already been mentioned in connection with the first embodiment can be used as well.

There has thus been shown and described a novel demolding device for demolding a work piece from a mold which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A demolding device for demolding a work piece from a mold comprising an upper mold component and a lower mold component with the mold components being movable relative to each other along a stroke direction, said demolding device further comprising:
   a hold-down element, which in the closed state of the mold is arranged at least partially between the mold components and extends toward a cavity provided for manufacturing the work piece, where it forms a portion of a shape-giving surface;
   a piston connected to the hold-down element and coupled in a form-fitting manner via a guide device with one of the mold components, wherein the piston (a) is movable along a first path distance w1, which is limited by the guide device along the stroke direction, and (b) is supported in a pivoting manner in the guide device, and wherein, at a pivoting movement, an end of the piston (11; 11') that points toward the cavity is moved away from it; and
   a first control element that is connected to the other mold component and that blocks pivoting of at least one of the piston and the hold-down element during the first path distance w1.

2. A demolding device as defined in claim 1, wherein the guide device comprises at least one guide component that is connected to the first mold half and that includes a guide track on which a glide element connected to the piston is movably arranged.

3. A demolding device as defined in claim 1, wherein the guide device comprises at least one guide component that includes a glide element connected to the piston, said glide element being movably guided in a guide track that is connected to the first mold half.

4. A demolding device as defined in claim 2, wherein the guide track is formed by a recess in the form of a longitudinal hole and the glide element includes a bolt element guided in the guide track.

5. A demolding device as defined in claim 3, wherein the bolt element is arranged perpendicular to the stroke direction and forms a rotational axis upon which the piston is pivotally supported.

6. A demolding device as defined in claim 5, further comprising an actuator element that affects a pivoting motion around the rotational axis of the piston.

7. A demolding device as defined in claim 6, wherein the actuator element is arranged adjacent to the hold-down element between the piston and the lower mold component.

8. A demolding device as defined in claim 6, wherein the actuator element is a spring element.

9. A demolding device as defined in claim 6, wherein the actuator element is a pneumatic cylinder or a hydraulic cylinder.

10. A demolding device as defined in claim 1, wherein the control element exhibits includes at least one control edge that is provided for contact on a guide surface on at least one of the piston and the hold-down element and that includes at least two areas, wherein a first area that points toward the upper mold component and a guide surface on the piston extends essentially parallel to the stroke direction, and a second area of the control edge includes a set-off, wherein the second area of the control edge contacts at least one of the piston and one end of the hold-down element when closing the mold and causes a rotational movement of the piston around the rotational axis in the direction of the lower mold component.

11. A demolding device as defined in claim 10, wherein the second area of the control edge has a slanted shape.

12. A demolding device as defined in claim 1, wherein a recess is provided in the upper mold component for receiving a section of the hold-down element.

13. A demolding device as defined in claim 1, wherein the hold-down element includes a mold draft in the area that points towards the upper mold component.

14. A demolding device as defined claim 1, wherein on the area underneath the rotational axis a second control component is connected to the lower mold component that includes an incline which glides down at the closing movement of the mold onto a rear lower guide surface of the piston.

15. A demolding device as defined in claim 1, wherein in the area underneath the rotational axis a second control component is arranged that is designed as an extension of the piston that extends beyond the rotational axis and glides down a pin element that is arranged perpendicular to the stroke direction in a guide component that is connected to the lower mold component.

16. A demolding device as defined in claim 10, wherein the second area of the control edge has an arch shape.

* * * * *